July 22, 1969

W. C. WEST 3,456,607

AGRICULTURAL DEVICE

Filed Nov. 4, 1966

Wilbur C. West
INVENTOR.

BY Clarence A. O'Brien
and Harvey B. Jacobson
Attorneys

July 22, 1969

W. C. WEST 3,456,607

AGRICULTURAL DEVICE

Filed Nov. 4, 1966

Wilbur C. West
INVENTOR.

July 22, 1969  W. C. WEST  3,456,607
AGRICULTURAL DEVICE

Filed Nov. 4, 1966  5 Sheets-Sheet 3

Wilbur C. West
INVENTOR.

BY *Clarence A. O'Brien*
and *Harvey B. Jackson*
Attorneys

Wilbur C. West
INVENTOR.

July 22, 1969  W. C. WEST  3,456,607
AGRICULTURAL DEVICE

Filed Nov. 4, 1966  5 Sheets-Sheet 5

Wilbur C. West
INVENTOR.

United States Patent Office 3,456,607
Patented July 22, 1969

3,456,607
AGRICULTURAL DEVICE
Wilbur C. West, Pine Bluff, Ark., assignor to W. & A. Manufacturing Company, a corporation of Arkansas
Filed Nov. 4, 1966, Ser. No. 592,211
Int. Cl. A01c 7/18, 5/06; A01b 49/04
U.S. Cl. 111—85                                5 Claims

ABSTRACT OF THE DISCLOSURE

An agricultural device including a supporting frame carrying a depending harrow followed by a row shaper immediately rearward thereof. The row shaper includes an upward and outward flaring throat portion and a trailing horizontal portion. The trailing portion of the shaper is provided with vertically adjustable supporting arms, and additional adjustment means are provided between the forward portion of the shaper and the adjustable supporting arms. The row shaper is in turn followed by a furrow opener and planting means.

---

This invention generally appertains to improvements in agricultural equipment and more particularly relates to a novel soil treating and planting device for effectively, efficiently and speedily planting any row crop.

An important object of the present invention is to provide a novel agricultural device for aerating and loosening the soil, shaping the thusly conditioned soil in a precise manner into a smooth and compact row of the desired size (width, height and shape) to accommodate the particular crop being planted and immediately subsequent thereto forming furrow openings in the row and planting the seeds and covering over the furrow openings.

A further important object of the present invention is to provide a novel precision row or bed shaper in combination with a V harrow and a planter.

A still further important object of the present invention is to provide a novel structural and functional relationship between a novel precision bed shaper and a planter furrow opener so as to allow the planter furrow opener to be inserted into the soil at a precise and predetermined depth to achieve precision planting which is so important in the planting of all row crops.

Another important object of the present invention is to provide a novelly constructed and supported precision seed bed shaper in conjuncton with a V harrow, which is designed to flatten, aerate and loosen the soil prior to action on the soil by the bed shaper and to provide novel, simple and compact interrelated supporting means for the V harrow and the precision seed bed shaper.

A still further important object of the present invention is to structurally and functionally associate the planting device with the precision bed shaper for compactness and more accurate control of the device and to mount the bed shaper in a manner so that it can be adjusted to effect an increase or decrease in firmness of the soil being shaped without altering or changing the depth of seed being planted.

A still further important object of the present invention is to provide a novel combination V harrow, which constitutes the forward portion of the agricultural device and is adjustable in depth and designed to flatten, aerate and loosen the soil, and precision seed bed shaper disposed immediately behind the harrow to form the loosened soil into smooth beds and planter means immediately following the precision seed bed shaper and forming a part of the precision bed shaper for compactness and more accurate control, with the device being capable of functioning in one row or multiple row operation and adapted to be mounted on farm tractors or other equipment and carried in transport or towed in use by a hitch means, preferably a three-point hitch, which is a part of the tractor or other drafting equipment and which is also adapted to be drafted by other traction equipment when in actual operation and to be transported from one field to another.

A further important object of the present invention is to provide an inexpensive, compact, sturdy, reliable and easily operated and controlled agricultural device in the nature of a combination bed preparation, bed shaping and precision depth planting device which functions to reduce labor and tillage required to effectively plant any row crop.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
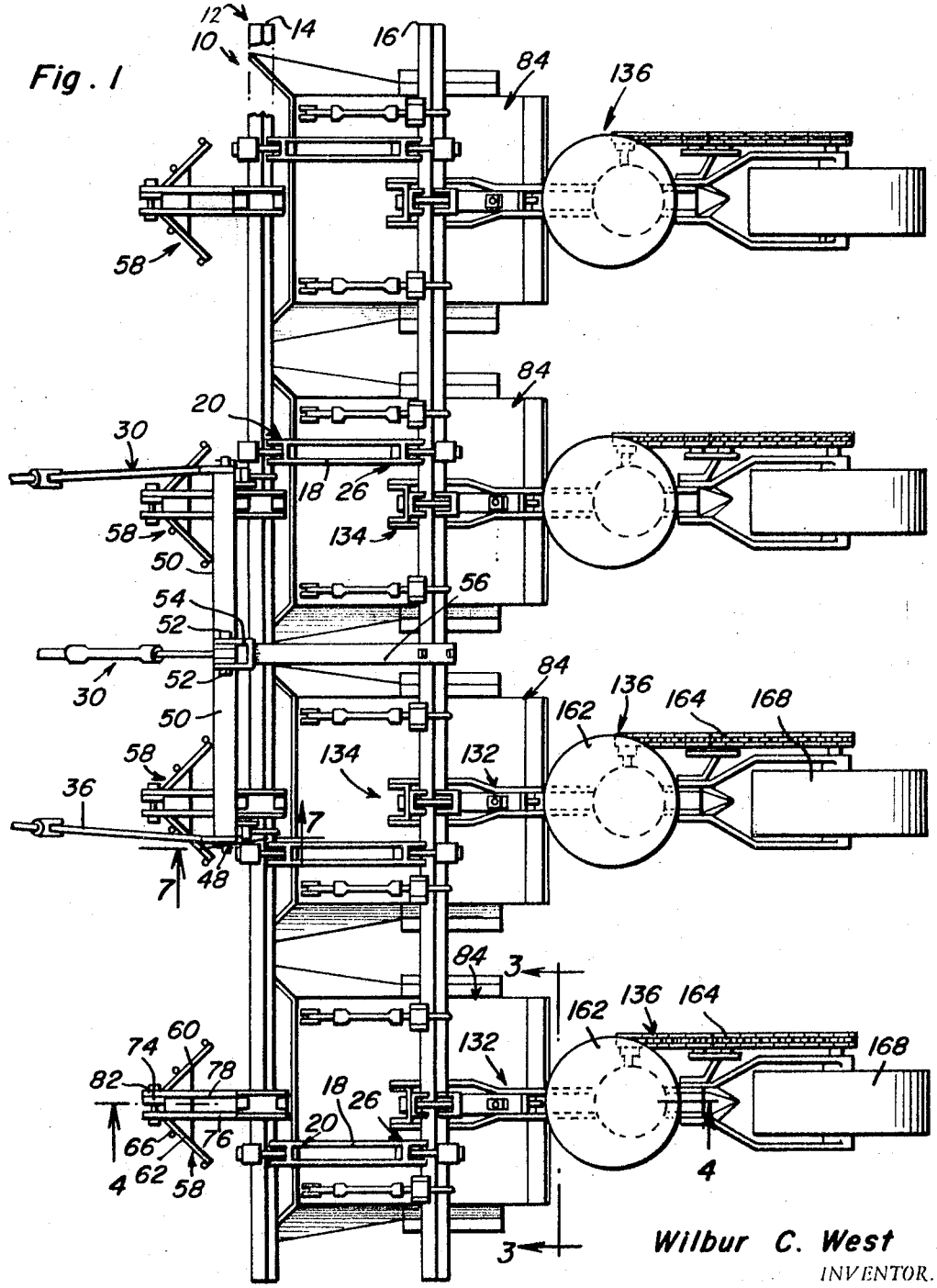
FIGURE 1 is a top plan view of a combination bed preparation, bed shaping and precision-depth planting device, constructed in accordance with the present invention.

Referring now more particularly to the accompanying drawings, the agricultural device of the present invention is generally represented by the reference numeral 10 and includes a supporting frame 12. The frame 12, as shown in FIGURES 1 and 2, includes a pair of transversely extending and longitudinally spaced, elongated tool bars 14 and 16, which are rigidly interconnected and supported in coplanar or horizontal relationship by short, longitudinally extending spacer blocks 18 that are attached to the tool bars adjacent the outer end portions thereof and adjacent the central portion thereof, as shown clearly in FIGURE 1.

Figure 4:
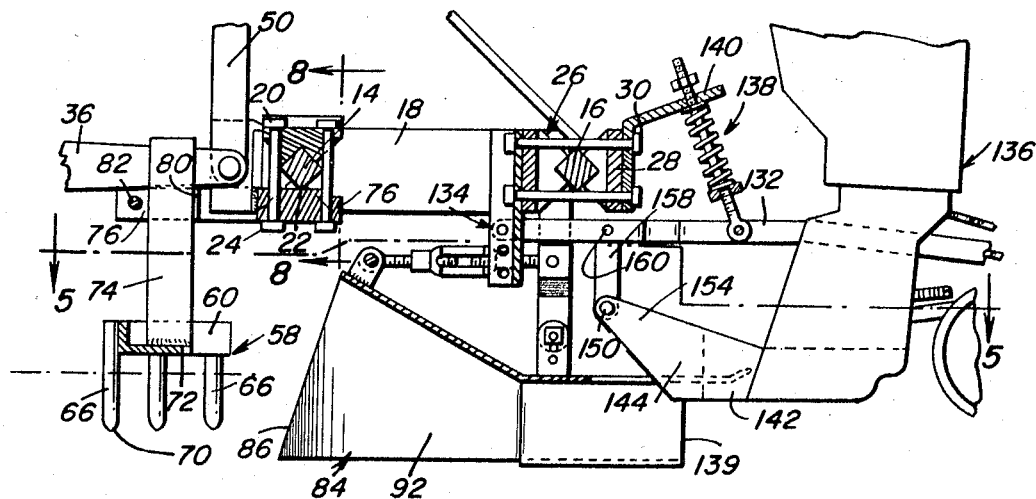
FIGURE 4 is a longitudinal, vertical sectional view, taken substantially on line 4—4 of FIGURE 1.
Figure 5:
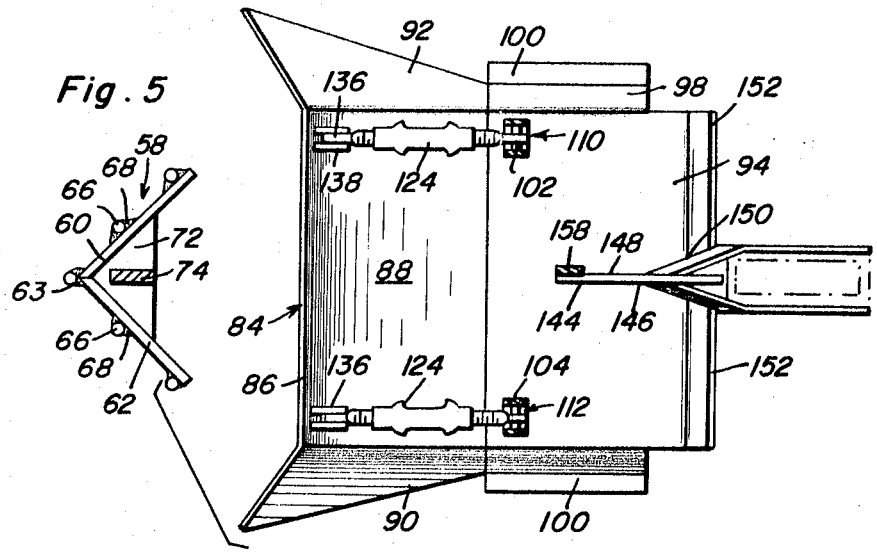
FIGURE 5 is a longitudinal, horizontal sectional view, taken substantially on line 5—5 of FIGURE 4.

The forward and rearward tool bars, 14 and 16, are noncircular in cross-section and preferably are of square cross-sectional configuration and are disposed so that their flat faces are angularly inclined, thereby presenting forward and rearward edge portions to which the spacer blocks 18 are attached. The spacer blocks 18 are secured by a clamping means 20 to the forward tool bar 14, as shown in FIGURE 4, with the clamping means being composed of clamping plates 22 and fastening rods 24, the latter being vertically orientated, while the spacer blocks 18 are attached to the rearward tool bar 16 by a clamping means 26, which is composed of clamping plates 28 and interconnecting fastening rods 30, which are horizontally orientated and extend longitudinally of the framework.

Figure 2:
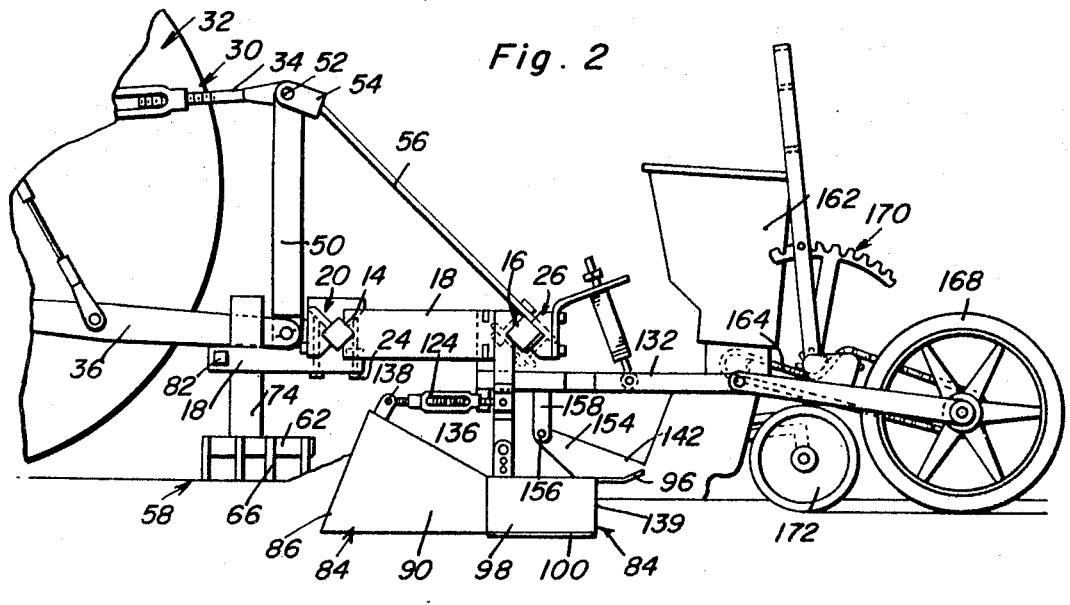
FIGURE 2 is a side elevational view of the device showing the same in use.

As shown in FIGURES 1, 2, 7 and 8, the supporting frame is constructed to be attached at the forward tool bar 14 to a conventional three-point hitch assembly 30 of a conventional tractor 32, which is partly shown in FIGURE 2. The three-point hitch assembly 30 is used not only to couple the device 10 to the tractor for draft purposes but is also employed to raise the device out of ground engagement so that it can be moved by the tractor or similar traction vehicle from field to field out of ground engagement. The three-point hitch assembly 30, as is conventional, comprises an adjustable upper link 34 and a pair of lower arms 36.

Figure 7:
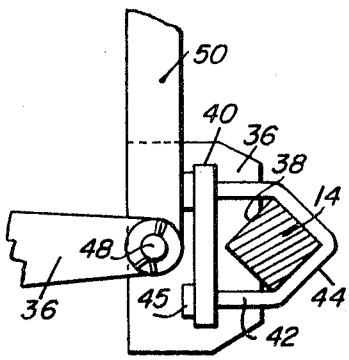
FIGURE 7 is a detailed longitudinal vertical sectional view, taken substantially on line 7—7 of FIGURE 1 and showing the means for attaching the device to a hitch assembly of a tractor.
Figure 8:
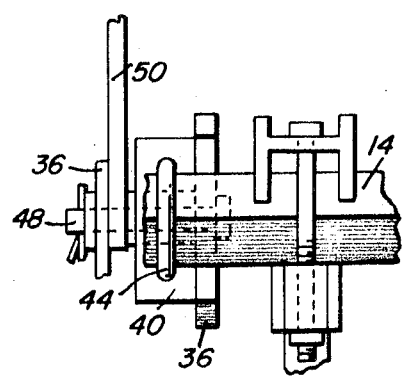
FIGURE 8 is a fragmentary vertical cross-sectional view, taken substantially on line 8—8 of FIGURE 4, and, FIGURE 9 is a perspective view of the bed shaper and means for adjustably attaching it to the frame structure of the device.

As shown in detail in FIGURE 7, the tool bar 14 is provided with supporting plates 36, which are vertically orientated and have V-shaped cutout portions 38 in their rear edges to complement and receive the front edge portion of the tool bar 14. The plates 36 are formed with fixed laterally extending flanges 40, which are apertured to receive the legs 42 of a substantially U-shaped clamping strap 44 which is fitted around the tool bar and the bight portion of which is triangularly shaped to complement the rear edge portion of the tool bar. The legs 42 are disposed through suitable openings in the plate 40 and are provided with fastening nuts 45. The plates 36 support pivots 48 to which the rear ends of the lower arms 36 of the three-point hitch are attached and to which upstanding arms 50 are also pivotally attached, with the upper ends of the arms 50 being pivotally attached, as at 52, to the rear end of the upper link 34, the arms 50 being inwardly inclined toward the pivot point 52, as shown in FIGURE 1, and the connecting U-shaped coupling member 54 of the pivot assembly being rigidified by a brace arm 56, which extends rearwardly and downwardly and is attached to the rear tool bar 16.

The agricultural device or implement 10 is composed of V harrows 58. In this respect, the device 10 as aforestated, is adapted to be used in multiple row work and, therefore, the number of harrows, which are carried by the front tool bar 14 in a manner to be described and which are spaced along the extent of the tool bar and transversely of the device 10 will depend upon the number of rows, as will the row shapers and planters associated in rearwardly successive or trailing relationship with each harrow.

Figure 6:
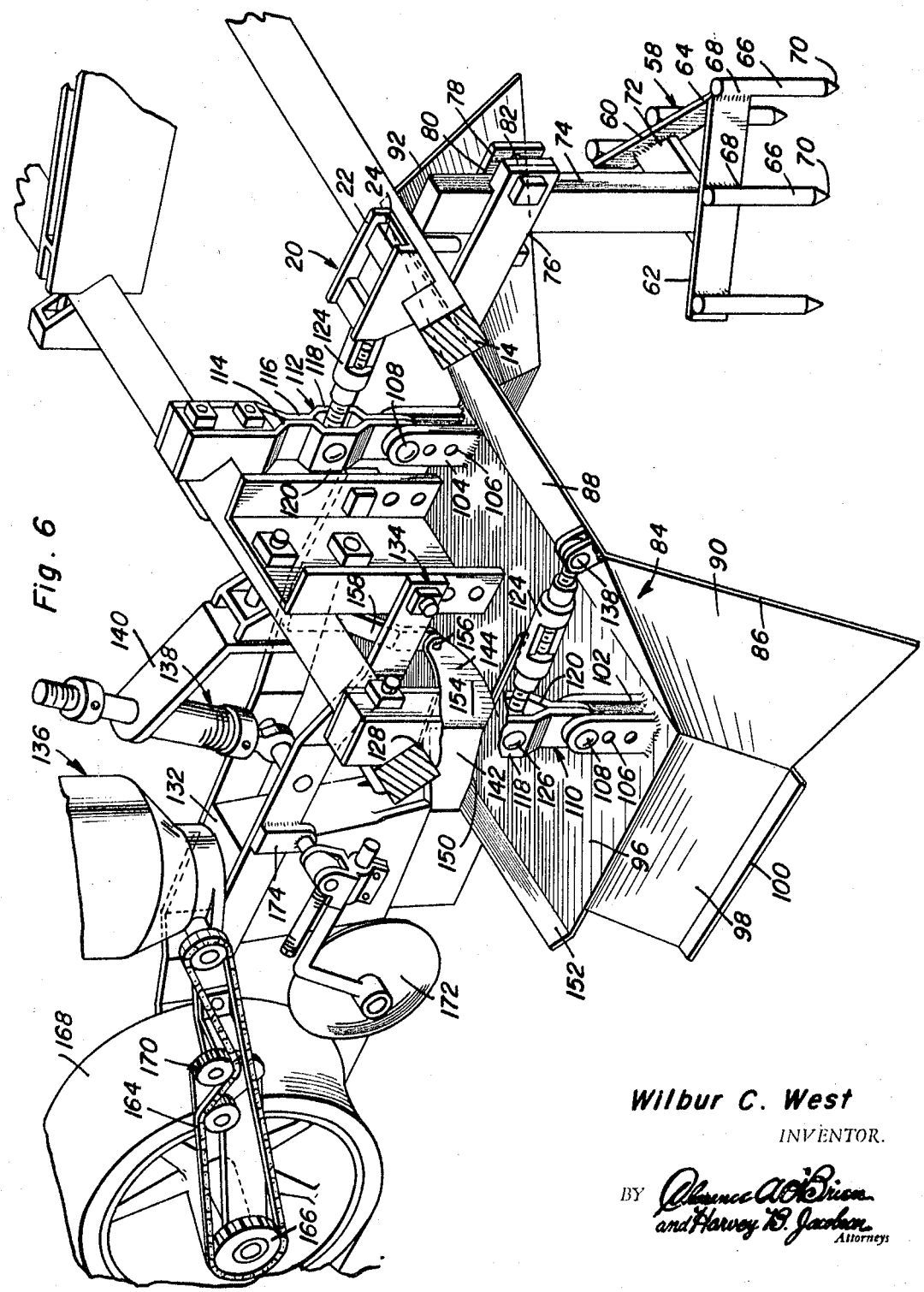
FIGURE 6 is an enlarged perspective view of the device.

Each harrow 58, as shown more particularly in FIGURE 6, is V-shaped and includes a pair of rigid plates 60 and 62 which are in acute angular relationship and are joined at their forward ends 64. A plurality of digger teeth 66 descend from the plates 60 and 62, which form a framework for each harrow 58. The teeth 66 are in the form of solid rods having their upper end portions secured, as by welding 68, to the front connecting edges 63 of the plates and secured in spaced relation along the outer sides of the plates at the center and rear ends thereof. The rods 66, which constitute the digger teeth, terminate in lower sharpened or pointed end portions 70.

The framework of each harrow further includes a bridge plate 72, which is welded or otherwise secured between the inner faces of the plates 60 and 62 and from which a supporting arm 74 rigidly upstands, the lower end of the arm being welded or otherwise secured to the upper surface of the bridge plate 72. The arm 74 is vertically disposed between a pair of supporting arms 76 and 78, which, as shown in FIGURE 4, have their rear ends clamped between the lower plate 22 and the rods 24 of the clamping assembly 20 and which project forwardly from the forward or front tool bar 14. The outer projecting end portions of the longitudinally extending and horizontally disposed arms 76 and 78 are provided on their inner surfaces with slideways 80 to slidably receive the vertical supporting arm 74 and a bolt assembly 82 clamps the outer ends of the arms 76 and 78 tightly together so as to hold the vertical supporting arm 74 in vertically adjusted positions relative to the frame 12. Thus, the harrows 58 are vertically adjustable, relative to the supporting frame 12 and are carried thereby in forwardly outstanding positions therefrom. The teeth 66 of each of the harrows are designed to flatten, aerate and loosen the soil, to uproot grasses and weeds that may be growing in the area. The V harrows 58 will destroy any vegetation that may be growing on the row so that the device can be used effectively for replanting the same beds which have been planted to the same crop or another crop. The harrows will loosen, aerate and prepare the soil for reshaping the rows or beds by the bed shaper 84, which is carried by the framework 12 and is disposed rearwardly of the harrow. Thus, as shown in FIGURE 1, a harrow 58 is carried by the forward tool bar 14 and is disposed forwardly thereof and is adapted to prepare the row or bed while a row or bed shaper 84 is carried by the rear tool bar 16 of framework 12 rearwardly of each of the harrows, which prepare the soil, for shaping or re-shaping of the rows or beds by the precision bed shaper 84.

Each shaper 84 comprises a throat portion 86, which is defined by an upwardly inclined top wall 88 and forwardly inclined and downwardly divergent opposing side walls 90 and 92. Each shaper has a trailing or outlet end 94, which is integral with the throat 86, the shaper being preferably formed of one piece construction. The rearward or trailing end 94 includes a flat top wall 96, which is horizontally disposed and is related at an obtuse angle to the inclined forward top wall 88 and which is disposed at a level slightly above the ground level L, as shown in FIGURE 4. The side walls 90 have rearward integral prolongations 98, which are outwardly divergent and terminate at their low ends in laterally outturned rails 100.

Means is provided for mounting each bed shaper 84 in a manner so as to adjust the same for the purpose of increasing or decreasing the firmness of the seed bed being shaped by the shaper.

Figure 3:
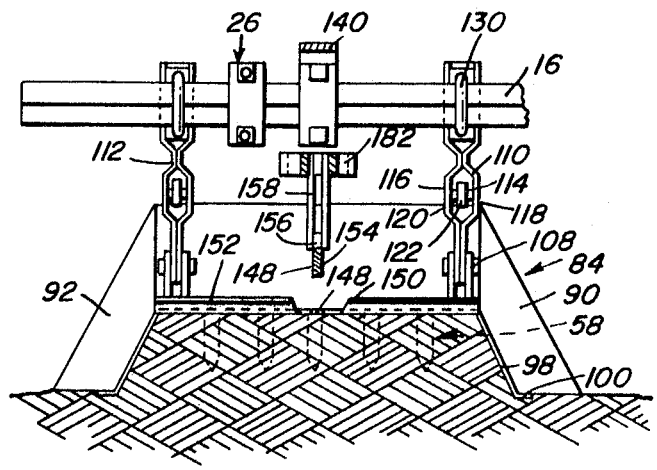
FIGURE 3 is a fragmentary, vertical cross-sectional view, taken substantially on line 3—3 of FIGURE 1 and showing in greater detail the mounting arrangement for the row or bed shaper.
Figure 9:
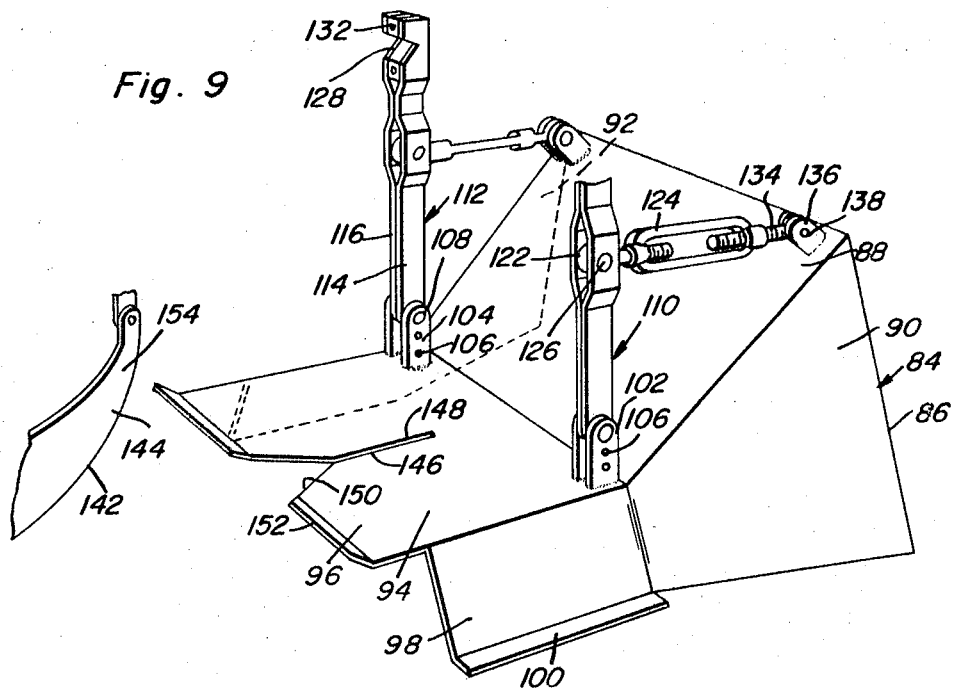

As shown more particularly in FIGURES 3, 4 and 9, the mounting means includes a pair of upstanding ears 102 and 104 fixed, as by welding or other means, to the exterior surface of the trailing top wall 96, adjacent the forward end at the point of juncture with the upwardly sloping top wall 88 at the forward end of the shaper, which constitutes the throat portion. The pairs of ears are provided with a series of vertically spaced transverse apertures 106 to receive pivot pin assemblies 108, whereby the lower apertured ends of arm units 110 and 112 are pivotally attached thereto. Each of the arm units is composed of a pair of complemental, side by side orientated arms 114 and 116, which have lower facially end contacting end portions that are pivoted between the ears by the pivot assemblies 108. Intermediate the end portions of each of the arms 114 and 116 and formed, substantially centrally between the end portions, each of the arms is provided with laterally outstanding portions 118 and 120 which are spaced apart to accommodate the end portion 122 of one of the bolt ends of a turnbuckle link 124. The ends 122 are pivoted between the arm portions 118 and 120 by pivot pins 126. The upper ends of the arm sections are joined together and are provided with a V-shaped recess 128. The V-shaped slots are adapted to engage the front angular edges of the rear tool bar 16 and are securely clamped thereto by substantially U-shaped clamping straps 130 which embrace the rear edge portion of the rear tool bar 16 and have their legs inserted through openings 132 in the leg portions of the companion legs 110 and 112 and fixed by nuts thereto.

The opposing threaded stud end 134 of each of the turnbuckles 124 is pivotally mounted between pairs of ears 136 by pivot pins 138, the ears being fixed to the outer edge portion of the top wall 88 being disposed perpendicular thereto.

Thus, as can be appreciated from a consideration of FIGURES 2 and 4, by adjusting the turnbuckles 124, the bed shapers can be lowered or raised so as to increase or decrease the firmness of the seed bed being formed and shaped. It can be appreciated that by virtue of the particular mounting arrangement, the shapers can be individually tilted forward and backward so as to give individual shaping or forming to each of the rows or beds. However, the shapers can be disposed so that all of the rows are shaped the same. Thus, all of the shapers can be evenly aligned when two or more units are utilized, as shown, for multi-row operation.

The supporting companion arm arrangement 132, which has its forward end pivoted, by a clamping, pivoted supporting assembly 134 on the rear tool bar 16, is provided and supports a seed planter unit 136, immediately rearwardly of the exit end 139 of the row or bed shaper 84, as shown particularly in FIGURE 4. The supporting arm arrangement 132 for each of the seed planters 136 is pivoted for movement about a horizontal axis at the pivot point 134 and is provided wtih an adjustable tension spring arrangement 138, which is pivotally connected between the bar arrangement and a supporting plate 140 clamped by the clamping means 26 to the rear tool bar 16.

The planter unit 136 includes a planter-furrow opener 142, which has the major portion of its furrow or opening forward end portion 144 disposed within a slot 146 formed in the top wall 94 of the rear end portion or trailing 94 of the row or bed shaper. The slot 146 is in the nature of a slit 148, which has a V-shaped convergent entrance or throat portion 150 that passes through the upturned transverse rear edge portion 152 of the top wall 96, as shown in FIGURE 9.

The slot or slit 148 with its enlarged inlet or throat portion 150 is adapted to receive the planter-furrow opener 142 and allows the planting device 136 to be moved forward and become a part of the precision bed shaper 84 for compactness and more accurate planting depth control of the device.

The 'planter-furrow opener 142 has a front upwardly extending end portion 154 which upstands from the slit or slot 148 and is attached by a pivot pin 156 to a depending pivot arm 158 which has its upper end pivoted as at 160 to the arm arrangement 132.

The planter assembly includes a conventional seed hopper 162, which is controlled by an operating chain 164 through a sprocket arrangement, including a drive sprocket 166 on a ground engaging wheel 168. A conventional adjustment means 170 is provided and serves as a means by which the ground engagement wheel 168 of the planter is raised or lowered to adjust the depth at which the seed is planted.

The device 10 further includes cover up disks 172, which are of conventional construction and are attached by mounting plates 174 to the arm arrangement 132.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A soil working and planting device comprising a supporting frame, harrow means carried by the frame and depending therefrom forwardly of the frame, row shaper means carried by the frame and disposed rearwardly of the harrow means, a planter-furrow opener operatively associated with each of the row shaper means and carried by the frame and planting means operatively carried by the frame in trailing relation to the planter-furrow openers with the harrow means, row shaper means, planter-furrow opener and planting means being disposed in longitudinal alignment and in rearwardly successive cooperative relationship, said harrow means being carried by the forward portion of the supporting frame and depending therefrom and said row shaper means including a row shaper disposed immediately rearwardly of the harrow means and positioned subjacent and carried by the supporting frame, means being provided for adjusting the bed shaper so as to increase or decrease the firmness of the seed bed, said row shaper including an upwardly and outwardly divergent forward throat portion and a horizontal trailing portion in communication with the throat portion and said adjustment means being connected between the forward portion of the shaper member and the supporting frame, said adjustment means including a pivoted turnbuckle arrangement pivotally interconnected between the forward portion of the shaper and the supporting frame, said trailing portion of the shaper being provided with vertically adjustable supporting arms carried by the rearward portion of the supporting frame and to which the turnbuckle means is pivotally connected.

2. The invention of claim 1 wherein said trailing portion of the row shaper has a flat top wall provided with a longitudinal slot and said planter-furrow opener is provided with a forward portion positioned in said slot.

3. The invention of claim 2 wherein said top wall having the slot is provided with a rear edge and said slot is provided with an enlarged entrance opening for receiving the forward end portion of the furrow opener and means is provided for pivotally attaching the forward end portion of the furrow opener to the supporting frame.

4. The invention of claim 3 wherein said last-named means includes a pivoted arm arrangement pivotally attached to the supporting frame and to which the forward portion of the furrow opener is pivotally attached.

5. The invention of claim 4 wherein said planting means is operatively associated with said planter-furrow opener and is disposed rearwardly thereof and rearwardly of the exit end of the bed shaper.

References Cited
UNITED STATES PATENTS

| | | | |
|---|---|---|---|
| 72,703 | 12/1867 | Vaughn | 111—54 |
| 1,254,859 | 1/1918 | Siemann | 111—61 |
| 2,475,078 | 7/1949 | Cherry | 111—85 |
| 3,252,522 | 5/1966 | Taylor | 172—519 X |
| 3,316,865 | 5/1967 | Williams | 172—68 X |

ANTONIO F. GUIDA, Primary Examiner

RONALD C. HARRINGTON, Assistant Examiner